United States Patent
Mishra et al.

(10) Patent No.: US 9,461,978 B2
(45) Date of Patent: Oct. 4, 2016

(54) SYSTEM AND METHOD FOR MANAGING ROLE BASED ACCESS CONTROLS OF USERS

(71) Applicant: Tata Consultancy Services Limited, Mumbai, Maharashtra (IN)

(72) Inventors: Satya Narayan Mishra, Orissa (IN); Ashesh Misra, Orissa (IN)

(73) Assignee: Tata Consultancy Services Limited, Maharashtra (IN)

( * ) Notice: Subject to any disclaimer, the term of this patent is extended or adjusted under 35 U.S.C. 154(b) by 220 days.

(21) Appl. No.: 14/032,777

(22) Filed: Sep. 20, 2013

(65) Prior Publication Data

US 2014/0090026 A1   Mar. 27, 2014

(30) Foreign Application Priority Data

Sep. 25, 2012 (IN) .................. 2773/MUM/2012

(51) Int. Cl.
*H04L 29/06* (2006.01)
*G06F 21/60* (2013.01)

(52) U.S. Cl.
CPC ............. *H04L 63/08* (2013.01); *G06F 21/604* (2013.01)

(58) Field of Classification Search
CPC combination set(s) only.
See application file for complete search history.

(56) References Cited

U.S. PATENT DOCUMENTS

| | | | |
|---|---|---|---|
| 8,132,231 B2 | 3/2012 | Amies et al. | |
| 8,381,306 B2 | 2/2013 | McPherson et al. | |
| 2002/0091989 A1* | 7/2002 | Cole | G06F 8/10 717/102 |
| 2003/0229812 A1 | 12/2003 | Buchholz | |
| 2004/0083367 A1* | 4/2004 | Garg et al. | 713/170 |
| 2005/0086213 A1* | 4/2005 | Terao | 707/3 |
| 2005/0119905 A1* | 6/2005 | Wong | G06Q 10/04 705/50 |
| 2006/0123022 A1* | 6/2006 | Bird | G06F 17/30601 |
| 2006/0218394 A1* | 9/2006 | Yang | 713/167 |
| 2007/0283443 A1 | 12/2007 | McPherson et al. | |
| 2008/0168528 A1 | 7/2008 | Lin et al. | |
| 2008/0313008 A1* | 12/2008 | Lee | G06Q 10/06 705/7.23 |
| 2009/0076865 A1* | 3/2009 | Rousselle | G06Q 10/00 705/7.36 |
| 2009/0307743 A1* | 12/2009 | Azagury | G06F 21/604 726/1 |
| 2013/0346339 A1* | 12/2013 | Yao | G06Q 10/06 705/348 |
| 2014/0316845 A1* | 10/2014 | Nayak | G06Q 10/10 705/7.28 |

OTHER PUBLICATIONS

"Repository Management with Nexus", Ed. 4.0.
Rüdiger Berndt Uwe Hoffmann ,Oxford Computer Group " Identity Management mit MIIS, Adam, & AzMan" Oxford Computer Group,architect Forum, p. 19.
Vincent C. Hu David F. Ferraiolo D. Rick Kuhn "Assessment of Access Control Systems"Vincent C Hu., U.S. Department of Commerce Information Technology Laboratory, National Institute of Standards and Technology Gaithersburg, MD 20899-8930,Sep. 2006.
Courion" RoleCourier Role Management".

* cited by examiner

*Primary Examiner* — Taghi Arani
*Assistant Examiner* — Phy Anh Vu
(74) *Attorney, Agent, or Firm* — Hayes Soloway PC

(57) ABSTRACT

A method and system for role based access control for a plurality of users in a heterogeneous enterprise environment, comprising: establishing a functional relationship between a plurality of provisioning unit using a provision unit module. The users are mapped with the provisioning unit based on attributes of the users. Events are captured via the provision unit module. The users needed to be re-mapped are determined upon the event completion. Application role defined in context of an application embedded in an application registry module is mapped with the provisioning unit. Call back service is executed for the re-mapped users having entitlement associated with each of the application stored in a roles registry module. An application role is determined and defined for a new user for the plurality of the application enabling managing of the role based access control.

9 Claims, 7 Drawing Sheets

SYSTEM AND METHOD FOR MANAGING ROLE BASED ACCESS CONTROLS OF USERS

FIELD OF INVENTION

The present invention relates to a method and system for managing access control. More particularly, the present invention relates to a method and system for managing access controls for a user in enterprise architecture, based on existing enterprise structure and function.

BACKGROUND OF THE INVENTION

The present role-based access control (RBAC) is an approach to secure and restrict the system access to a valid or authorized user in any organization. The role of each individual/user working in the organization is created and defined with respect to his functional role. The permission for the specific user to perform certain operation or access resources is based on their roles; they are not assigned permissions directly, but only acquire them through their role.

One of the prevalent RBAC approach utilizes a central role server or a directory structure such as Lightweight Directory Access Protocol (LDAP) for managing and retrieving entitlements associated with users and applications. This approach suffers from operational disadvantage that is governing the entitlements across multiple business domains in large enterprises with complex operation patterns.

A system and method for automatic generation of a role based access control model (RBAC) for an organizational environment with a role based access control system such as a hierarchical RBAC (HRBAC) is known within the art. The system teaches the method that includes accessing existing permissions granted to the users in the organizational environment and analyzing the permissions to create permission characteristics. The method further includes performing analysis on the permission characteristics to determine role perspective relationships between individual users of the organizational environment. A RBAC model is generated based on role perspective relationships determined between individual users of the organizational environment. Further the method includes generating a cladogram based on the determined role perspective relationships. However, since the focus of the system is on automated role modeling, and depends on existing permissions, the applicability of the system is limited and further in case of new implementation such permission may not exist, or not be available. Another drawback of the system is reliance on classification techniques which is not intuitive, and accuracy of such methods is a specialized task.

Many RBAC models for resource authorization are driven by resource consumption groups, members of a group are granted rights for resources consumption. The RBAC models based on resource consumption groups are not intuitive when numbers of groups grow beyond certain size, and therefore not suitable for authorization and access of business intelligence and data stored in multiple application contexts. Further they fail to address the enterprise organizational and operational perspective, where IT resource consumption is a means to achieve the organizational goals.

Presently, some systems for role management emphasize on distinction of business roles and technical roles. They define the authorization rights globally in a central server which could lead to explosion of roles types for a complex computational landscape and for larger organization. Having global authorization definitions is not applicable in situations where authorization definitions for particular applications require significant domain expertise and used in specific segments of organization. Further, roles viewed as a collection of entitlement rights is considered insufficient for supporting large enterprise structure.

In a role based access control system when user entitlements are managed by a subscription based application manager, the subscription are manifested as an account in the central identity management system. The drawback of such system is that the enterprise structure is not fully realized.

Therefore, there is a need in the art to, preserve the enterprise perspective by preserving the organizational experience, and support operation beyond individual information system in a role based access control. Further there is a need to reduce the complexities and improve the efficiency for governance of access entitlements across multiple business domains of an organization and within the application/computational scope where the access is realized.

OBJECTS OF THE INVENTION

The principal object of the present invention is to provide a system and method for managing role based access control for a plurality of users in a heterogeneous enterprise environment using a provisioning unit.

Another object of the present invention is to provide a system and method for integrating access control for users across information systems.

Another object of the present invention is to provide a system and method for capturing and preserving the existing access control roles and functional roles while providing an integrated role based access control across the systems.

Another object of the present invention is to provide a system and method for facilitating a central role server to provide functionality for integration of roles.

Another object of the present invention is to provide a system and method for providing instruments for capturing resource provisioning structure in an organization and functional or operational parameters.

Still another object of the present invention is to provide a system and method for access provisioning new computational resources to existing user base.

Still another object of the present invention is to provide a system and method for automatically managing access rights when users are assigned different roles in organization.

SUMMARY OF THE INVENTION

Before the present methods and systems are described, it is to be understood that the system and method for managing role based access control is not limited to the system and methodologies described, as there can be multiple possible embodiments, which are not expressly illustrated, in the present disclosure. It is also to be understood that the terminology used in the description is for the purpose of describing the particular versions or embodiments only, and is not intended to limit the scope of the present disclosure, which will be limited only by the appended claims.

An aspect of the present disclosure is to manage role based access control for a plurality of users in a heterogeneous enterprise environment by viewing the authorization rights as a mosaic, validating each in the context of the application or computing resource. By viewing the rights as a mosaic the need for defining the authorization rights in the central server is not required. The present disclosure uses a provisioning unit to view rights as a mosaic and carry the organizational, as well as cross organizational or intra organizational units.

According to another aspect of the present disclosure to preserve the focus on enterprise goals, the provisioning unit recognizes multitude of roles of user existing in an enterprise. In an enterprise the user assumes a role in its operational context. Thus enterprise role of the user is treated as an attribute of the provisioning unit, thereby preserving the focus on the enterprise goal.

According to another aspect of the present disclosure, a method for managing role based access control for a plurality of users in a heterogeneous enterprise environment is disclosed, wherein the method comprises of creating a provisioning unit using provision unit module and defining the relationship between the provisioning unit. The plurality of users are associated and mapped with the provisioning unit based on attributes of the plurality of users and the provisioning unit. Further, at least one event is captured via the provision unit module. Upon the event completion the plurality of users that need to be re-associated and re-mapped is determined. The method further comprises of mapping at least one application role defined in context of an applications embedded in an application registry module with the provisioning unit. Further, executing a call back service for the re-associated plurality of users having entitlement associated with each of the plurality of the application stored in a roles registry module, wherein the roles registry module is communicatively coupled to the provision unit module via the application registry module and determining, defining a application role for a new user for the plurality of the enterprise application enabling managing of the role based access control.

BRIEF DESCRIPTION OF DRAWINGS

The foregoing summary, as well as the following detailed description of preferred embodiments, is better understood when read in conjunction with the appended drawings. Drawings and illustrations described herein are intended to lay more emphasis on understanding the underlying principle of the invention. The manner in which the drawings are presented in no way limit the scope of the invention and the advantages one can garner from the embodiments of the present invention.

DETAILED DESCRIPTION

Some embodiments of this invention, illustrating its features, will now be discussed:

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise.

Although any systems, methods, apparatuses, and devices similar or equivalent to those described herein can be used in the practice or testing of embodiments of the present invention, the preferred, systems and parts are now described.

The disclosed embodiments are merely exemplary of the invention, which may be embodied in various forms.

Figure 1:
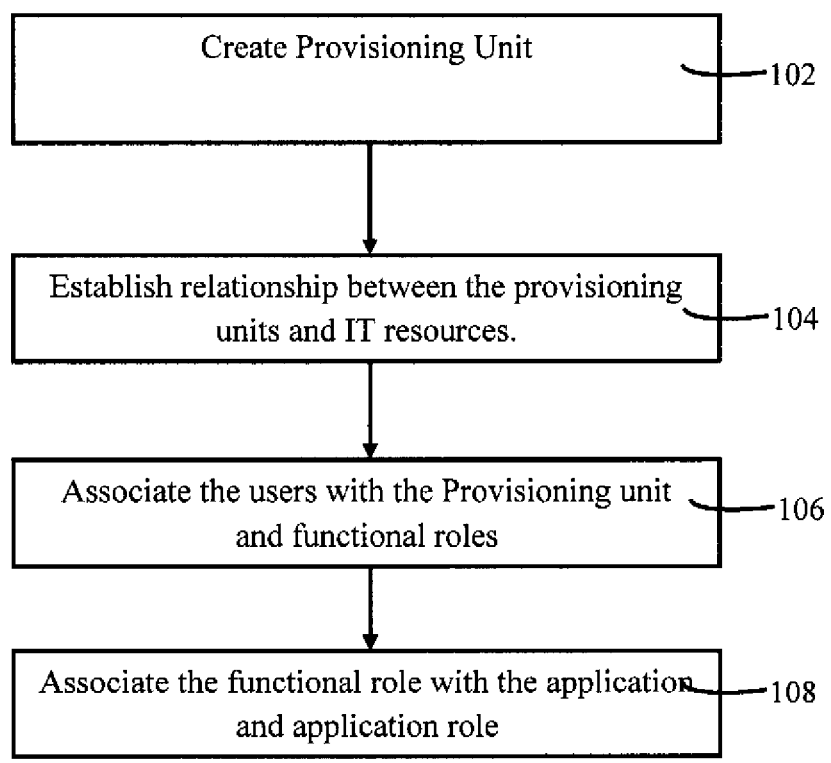
FIG. 1 shows a flowchart (100) illustrating the method for user interaction with Provisioning unit.

Referring to FIG. 1 is a flowchart (100) illustrating, the method for user interface interaction to operate on a provisioning unit.

The process starts at the step 102, the provisioning unit may be created representing the organizational context and the roles in the organization. At the step 104, the logical relationship is established between the provisioning unit and IT resources. At the step 106, a user is mapped with the role and the provisioning unit in order to gets access to an IT resource. The process ends at the step 108, in which the user's role is associated to the application to be completed.

Figure 2:
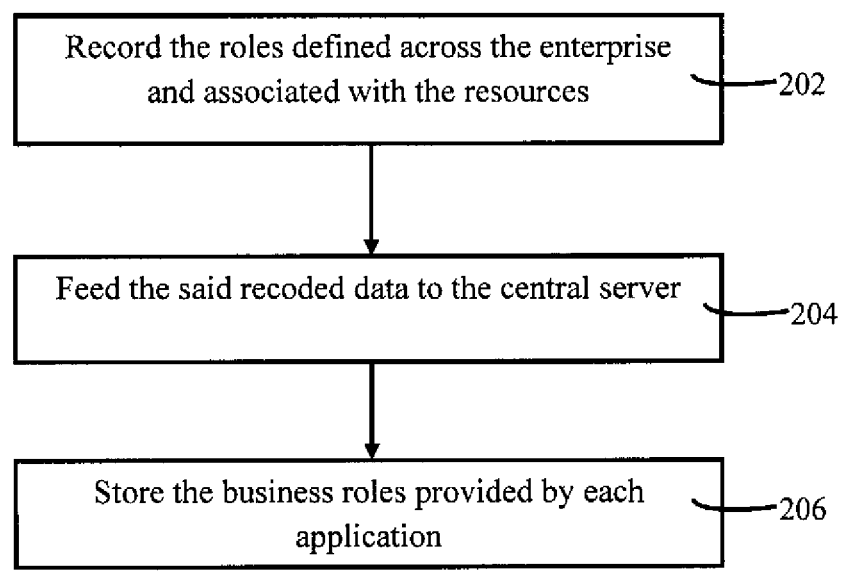
FIG. 2 shows a flowchart (200) illustrating the method for working of role registry.

Referring to FIG. 2 is a flowchart (200) illustrating, the method for working of role registry.

The process starts at the step 202, which record the roles defined across enterprise and associated with IT Resources. At the step 204, the recorded data roles are entered into the central server either from a screen or through automated processes as part of initial configuration. The process ends at the step 206, which stores each business role is in context of specific applications providing business functionality.

Figure 3:
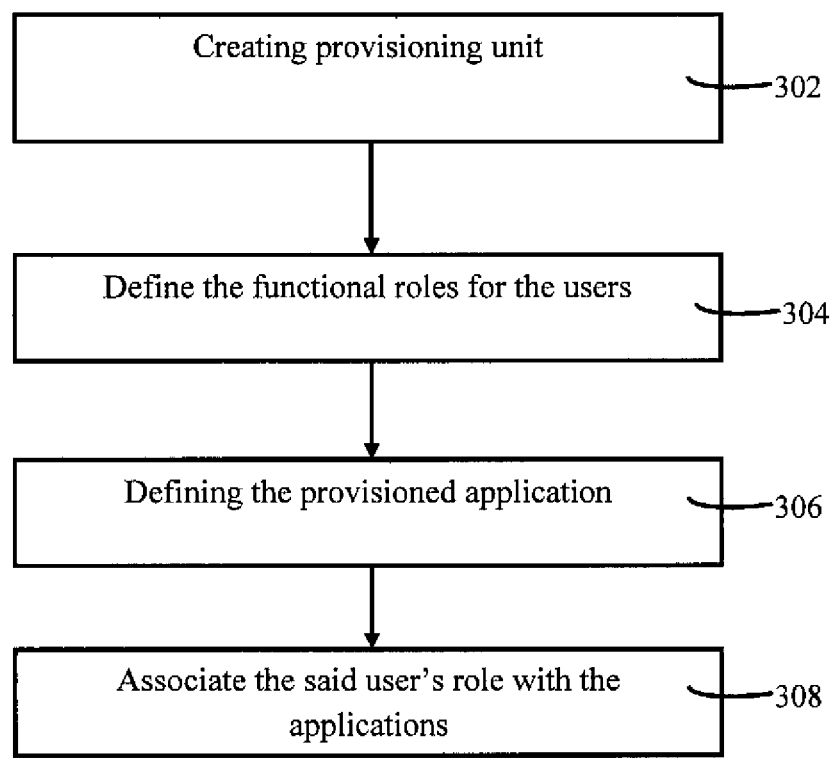
FIG. 3 shows a flowchart (300) illustrating the method for role context combination.

Referring to FIG. 3 is a flowchart (300) illustrating, the method for role context combination.

The process starts at the step 302, by creating at least one provisioning unit by using the provisioning unit module. At the step 304, functional roles associated with the provisioning unit may be defined. At the step 306, applications provisioned may be defined to the respective units. The process ends at the step 308, where the respective said roles are associated to provisioned application and application roles in context of the at least one provisioning unit.

Figure 4:
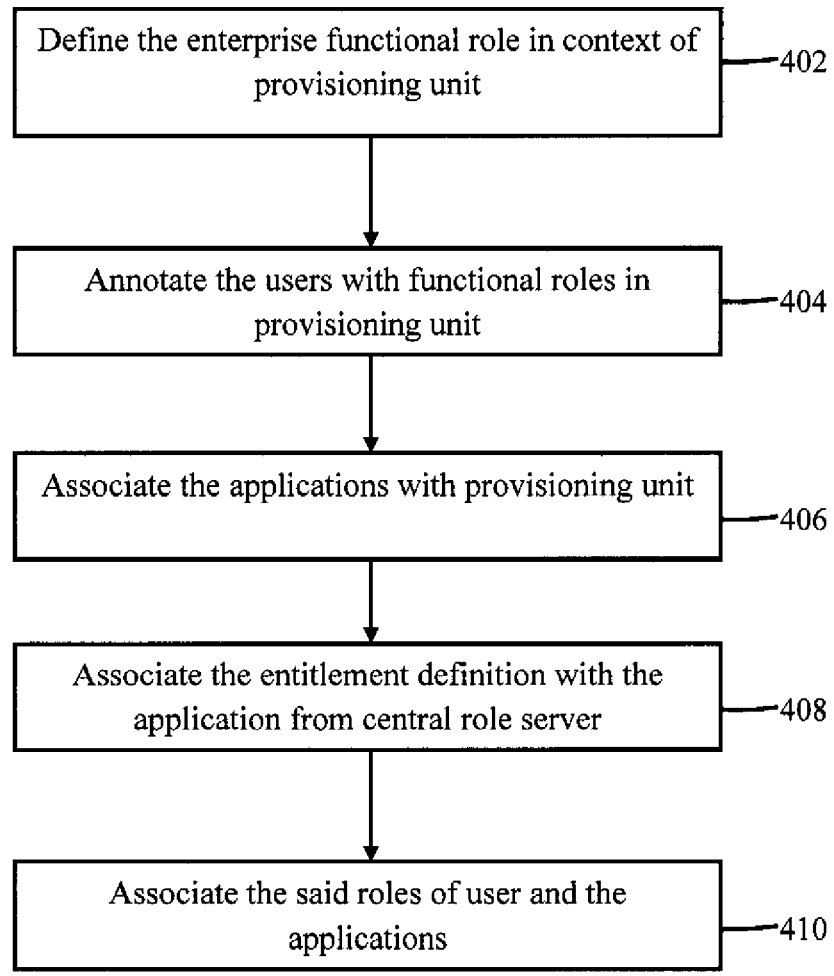
FIG. 4 shows a flowchart (400) illustrating the method for showing user interaction with the application through the provisioning unit.

Referring to FIG. 4 is a flowchart (400) illustrating, the method for showing user interaction with the application through the organization unit.

The process starts at the step 402, in which the functional roles of the users using organization units are defined using provisioning units. At the step 404, the functional roles of the users are annotated in provisioning unit. At the step 406, the provisioning units are associated with the applications assigned. At the step 408, definition entitled from the central role server is associated with the applications of the system. The process ends at the step 410, in which finally the roles of the user and the applications are matched.

Figure 5:
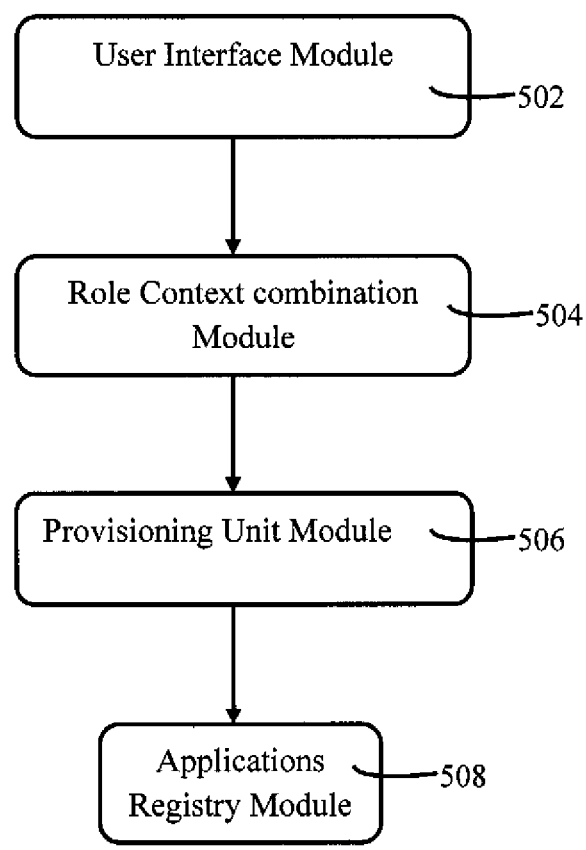
FIG. 5 shows a flowchart (500) illustrating the method for showing the flow of user interaction events.

Referring to FIG. 5 is a illustrating the system (500) for showing the flow of user interaction events.

The system architecture (500) for user interaction events comprises of a user interface module (502); a role context combination module (504); at least one provisioning unit module (506) and an application registry module (508).

In an embodiment of the present invention, the user interface module (502) is adapted to define the various roles of the users using the system. The user roles may include roles like business manager, associate, project manager, software engineer and the like.

In an embodiment of the present invention, the role context combination module (504) is adapted to primarily drive by the enterprise goals. For example, the context of the role may be affected by the organization context represented by the provisioning units, application context represented by an identity of IT Resource, such as application providing business functions where access rights are realized, business function context, represented by the categorization of access rights as defined in individual IT Resources.

This brings in the context of the business functions availed or functional context of the enterprise, roles which may include roles from the group such as manager, project leader, associate and the like. The role context combination may be created using the above four said categories.

In an exemplary embodiment of the present invention, the role context combination module (504) may take data inputs from screens. The central role management server may provide screens for registering the roles for the user's operating system and for creating a context combination of roles. For example, creating the role combination may involve, selecting the provisioning unit; selecting a functional role associated with the provisioning unit; selecting an application provisioned to the unit; selecting a role registered with the application and saving the selected elements as the context of realization of the role.

In an exemplary embodiment of the present invention, the role context combination module (504) may take services that are adapted for the role-context combination server to provide Application Program Interfaces (APIs) and services over Hyper-text transfer protocol (HTTP) and other protocols for serving the role information to individual applications, components registered with the role server. The Role-Context combination server may provide mechanism to register call-back services, which may be used for notifying changes to role context. Services may be registered for initialization of the role information in individual applications. A service management console may be provided to monitor the events that invoke registered services.

In another exemplary embodiment of the present invention, the role context combination module (504) may provide operation intelligence adapted for generating the events for responding to different operations. The examples of the operations that may generate event to affect the roles related information includes; adding or removing a user to the provisioning unit, transferring an user from one provisioning unit to another; creating or removing of a role-context combination; creating or deleting functional roles associated with the provisioning unit and provisioning a computation resource or application to the provisioning unit.

In an embodiment of the present invention, the provisioning unit module (506) is adapted to relate through a hierarchy or an independent unit represents the organization operation context. In typical enterprise scenario, there may be multiple provisioning units. The computational environment may constitute device drivers, applications or business services whereas in a heterogeneous environment, where applications and components sources from different vendors, each may have security and role management. This can be represented for mapping purpose by application context represented by application ID/component ID/device driver ID and the like and role name within the application granting rights to business functions. The functional role may be associated with provisioning unit. A functional role may have names/Ids such as manager and further attributes for operation efficiency.

In an exemplary embodiment of the present invention, the provisioning unit module (506) may be defined as the identity representing the organizational context primarily responsible for logical provisioning of IT resources. The provisioning unit may also contain the functional roles of the enterprise. A user may get access to an IT resource because of association with the provisioning unit, or a specific organizational role defined in the provisioning unit. The provisioning unit is the resource allocation view of the organization structure. The provisioning unit could be hierarchical in structure. The provisioning unit may provide functionalities for associating, editing and reporting of applications/computational units provisioned to the logical unit; associating, editing and reporting of functional roles; associating or removing users and for analytics and other information related to provisioning.

Figure 6:
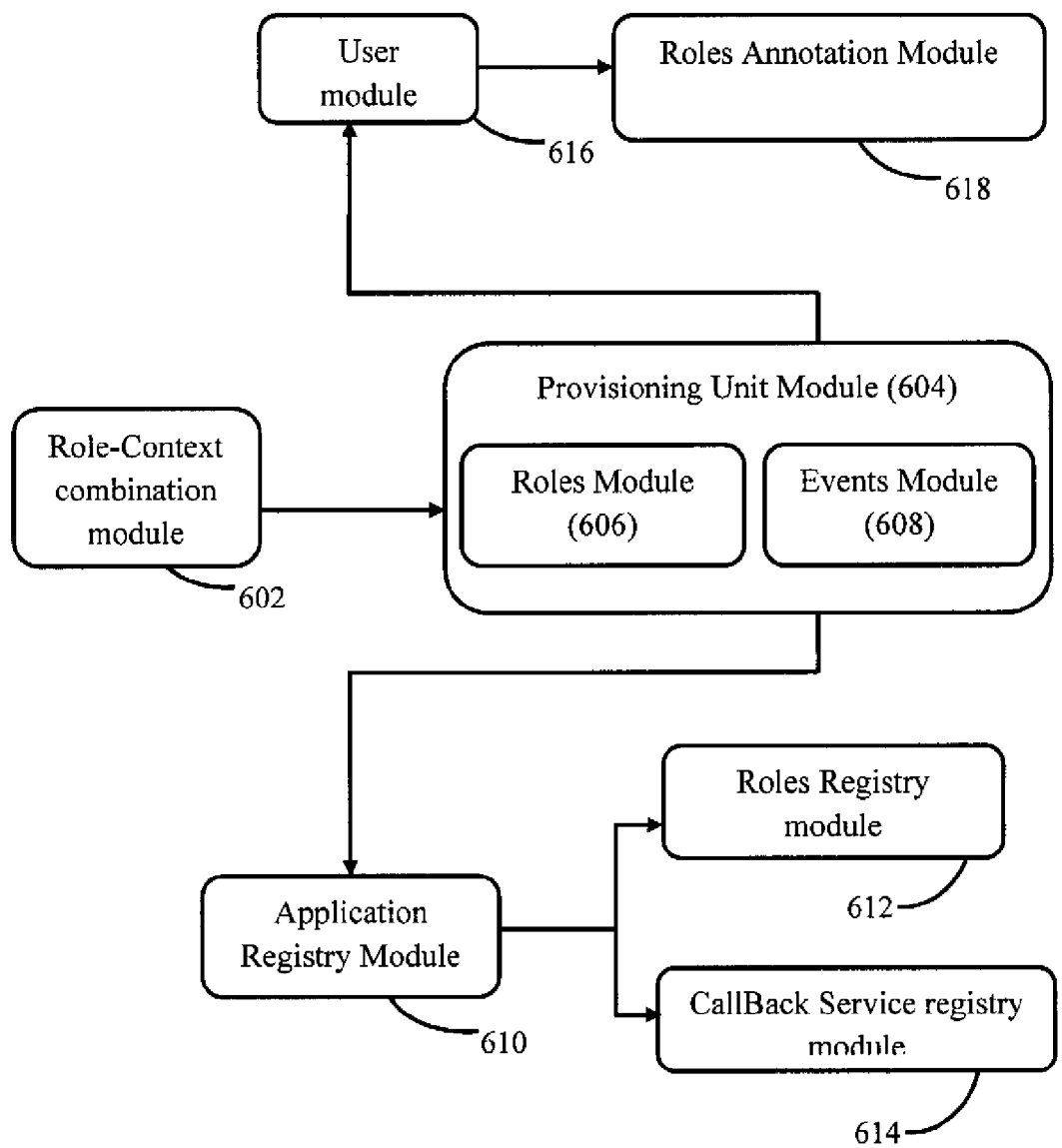
FIG. 6 shows a block diagram illustrating the system (600) for showing relation between various units of the system.

In an embodiment of the present invention, the applications registry module (508) is adapted to record the roles defined across enterprise and associated with IT resources. The said roles may be entered into the central server either from a screen or through automated processes as part of initial configuration. Since each business role may be in context of specific computational units or applications providing business functionality, the roles registry may provide functionality to store each business role along with ID/name of the application context in which it is defined. When a new application is added, the roles associated with the IT application are recorded by the central server. Referring to FIG. 6 is a illustrating the system (600) for showing relation between various units of the system. The system 600 in accordance with an embodiment may include at least one processor, an input/output (I/O) interface, and a memory. The at least one processor may be implemented as one or more microprocessors, microcomputers, microcontrollers, digital signal processors, central processing units, state machines, logic circuitries, and/or any devices that manipulate signals based on operational instructions. Among other capabilities, the at least one processor is configured to fetch and execute computer-readable instructions stored in the memory.

The I/O interface may include a variety of software and hardware interfaces, for example, a web interface, a graphical user interface, and the like. The I/O interface may allow the system 600 to interact with user directly or through the devices. Further, the I/O interface may enable the system 600 to communicate with other computing devices, such as web servers and external data servers (not shown). The I/O interface can facilitate multiple communications within a wide variety of networks and protocol types, including wired networks, for example, LAN, cable, etc., and wireless networks, such as WLAN, cellular, or satellite. The I/O interface may include one or more ports for connecting a number of devices to one another or to another server.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory may include modules.

The modules include routines, programs, objects, components, data structures, etc., which perform particular tasks or implement particular abstract data types. In one implementation, the modules may include a role context combination module (602), an provisioning unit module (604), an role module (606), an event module (608), an application registry module (610), an role registry module (612), an call back service registry module (614), an user module (616) and an role annotation module (618).

In an embodiment of the present invention, the role context combination module (602) is adapted to be primarily driven by the enterprise goals. The screen may be provided for providing functionality for creating groups of provisioning unit, the functional role, the provisioned application and roles defined in the application.

In an embodiment of the present disclosure, the provisioning unit module (604) is adapted to capture the enterprise functional roles from the group of roles comprising of manager, architect and the like. The provisioning unit captures various events, such as when a user is added or removed from a provisioning unit the event can be captured. When the functional roles of a provisioning unit is associated with application roles or when an association is removed the event may be captured. The various applications of organization are associated with a provisioning unit.

In an exemplary embodiment of the present disclosure, a screen may be provided for operating on the provisioning units. The provisioning unit may provide functionality for creating a plurality of provisioning units and establish a functional relationship between the plurality of provisioning units. It may provide functionality to associate users and provision applications.

In an embodiment of the present invention, the role module (606) is adapted for defining various roles of the user from the group of roles comprising of business manager, default role, architect, associate and the like. The roles are defined in such a way that, they may be assigned to any user as per the requirement.

In an embodiment of the present invention, the event module (608) is adapted for defining various events that may take place during the assignment of roles. The events may include any event from the group of events comprising of user add, user remove, role context changed, new user, new role and the like.

In an embodiment of the present invention, the application registry module (610) is adapted for storing all the information related to specific application in a logical repository. The logical repository may comprise of the number of discrete files related to discrete application. The application registry may include the information related to any creation of an application, any modification details related to the application like the user modifying the application or the date and time of modification, deletion of any application and the like.

In an embodiment of the present invention, the role registry module (612) is adapted for providing functionalities to register applications, business roles associated with the application. The role registry module (612) may also provide functionalities to call back services provided by the application for receiving events from the central role management server.

In an exemplary embodiment the role registry module (612) may be adapted for providing the registry provided to record the roles defined across enterprise and associated with IT Resources. Such roles are entered into the central server either from a screen or through automated processes as part of initial configuration. The roles registry may provide functionality to store each business role along with ID/name of the application context in which it is defined. Each and every activity related to the roles of the user may be recorded by the registry.

In an embodiment of the present invention, the call back service registry module (614) is adapted for receiving the events from central server. The call back service may be adapted to store the traces of the events related to the applications so that, the applications may be utilized using these traces easily.

In an embodiment of the present invention, the user module (616) is adapted for adding user for the roles assignment in the system. The user may assume a default role or a particular role defined in the provisioning unit upon its association with the provisioning unit. Thus the user may get roles to computational resources because of its association with provisioning unit and the functional context of the enterprise.

In an embodiment of the present invention, the role annotation module (618) is adapted for annotating the user with the functional enterprise role. The default role may be assigned when no particular role fits the user. Annotating the user may be achieved by associating the user with a role in the provisioning unit. The predefined roles in the provisioning unit may help the user's role assignment.

Figure 7:
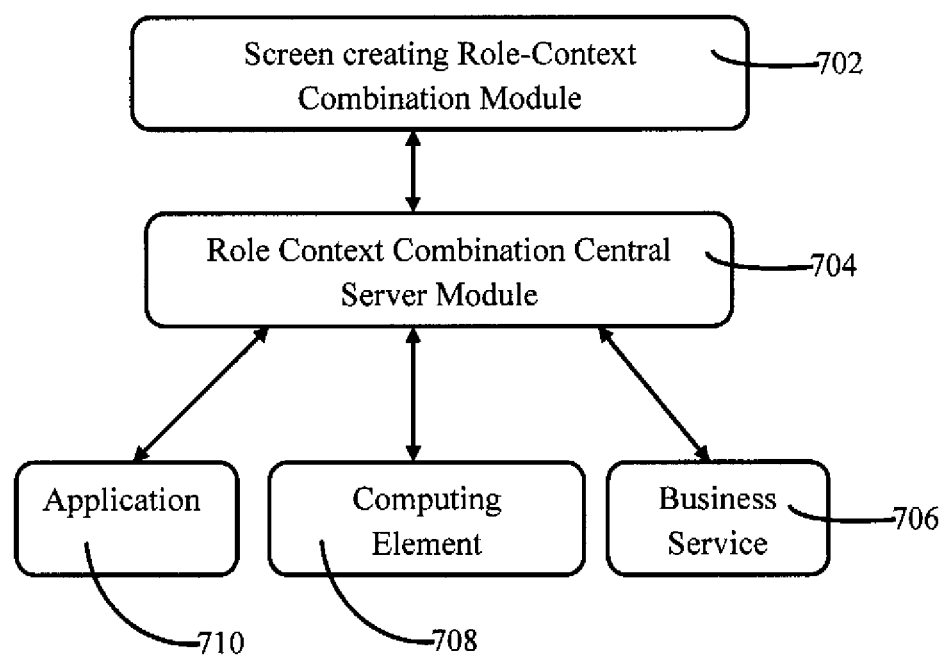
FIG. 7 shows a block diagram illustrating the system architecture (700) for user interaction associated with various components of the system.

Referring to FIG. 7 is a illustrating the system (700) for showing user interaction associated with various components of the system.

The system architecture (700) for showing user interaction associated with various components of the system comprises of a screen creating role context combination module (702); an role context combination central server module (704); a business service (706); an computing element (708) and an Application (710).

In an embodiment of the present invention, the screen creating role context combination module (702) is adapted for providing various functionalities to the user which may include user creates a new combination of provisioning unit, architect role with application account and application role view report. The screen may provide functionality for creating groups of provisioning unit, the functional role, the provisioned application and the roles defined in the application.

In an exemplary embodiment of the present invention, the screen creating role context combination module (702) may provide a screen for various roles in the provisioning unit, the various roles of the users assigned or to be assigned, applications assigned, the roles depending o the organization, and the like.

In an embodiment of the present invention, the role context combination central server module (704) is adapted to provide functionality for integration of roles of the organization. The definition of access rights may be maintained in the central role management server, and accessed by participating systems. The central server and services may be used for distributing the combination of enterprise contexts for determining the roles. The provisioning units may be created and stored by the central role server. The central role server may be used to distribute the role group. The central role server may optionally distribute access details for roles defined in specific context for reference purpose. Roles in specific context may be determined by querying the services or database or directory services hosted in central role server, which may use the central role-context combination. The central role server may optionally distribute access details for roles defined in specific context for reference purpose. The detailed access permissions could also be stored at the central server optionally for distribution purposes.

The roles may be entered into the central server either from a screen or through automated processes as part of initial configuration. When a new application is added, the roles associated with the IT application may be recorded by the central server. The central role management server may provide screens for registering the roles. The role-context combination is created between the organizational roles and application roles. The combination is managed by a central role server. In case of operational changes to the organization, when operation context is changed in the central server, it is automatically reflected in role based access because the permissions are driven by the operational context. The entitlement definition details can be associated with the applications for reference from the central role server.

In an embodiment of the present invention, the business service (706) is adapted for managing information technology (IT) systems, philosophically cantered on the customer's perspective of IT's contribution to the business. The business service may stands in deliberate contrast to technology centered approaches to IT management and business interaction. The Business services (706) may have interaction with the role context combination central server module (704).

In an embodiment of the present invention, the computing element (708) is adapted for providing some set of computing resources localized at a site. The computing element (708) may have interaction with the role context map central server module (704) which enables the user role assignment to access application.

In an embodiment of the present invention, the application (710) is adapted for designing to help the user to perform specific tasks. The application (710) may have interaction with the role context map central server module (704). The users with the specific roles are given access to perform the specific applications.

We claim:

1. A method for role based access control for a plurality of users in a heterogeneous enterprise environment, the method comprising:
   creating, by a processor, a plurality of provisioning units, wherein each provisioning unit represents one or more functional roles with respect to an organizational context;
   establishing, by the processor, a functional relationship between each of the plurality of provisioning units and one or more applications of a plurality of applications by mapping each of the one or more applications with each of the plurality of provisioning units;
   mapping, by the processor, a user of a plurality of users with a provisioning unit of the plurality of provisioning units having at least one functional role of the one or more functional roles associated with the user;
   creating, by the processor, a role-context for the user by mapping 1) the at least one functional role of the one or more functional roles associated with the user, 2) the provisioning unit mapped with the user, 3) an application context of each the one or more applications associated with the mapped provisioning unit, represented by an identity of one or more IT resources, and 4) a business function context represented by categorization of access rights as defined in the one or more IT resources as mentioned in the application context in order to get access to the one or more applications;
   register, by the processor, one or more services to initialize the at least one functional role of the user to receive the access right with the one or more applications based on the role-context of the user to enable the role-context based access control for the user; and
   receiving, from a computer of the user, an access permission to the one or more applications, based on the role context of the user, wherein the access permission is received from the processor.

2. The method of claim 1, further comprising,
   creating a role-context based on the one or more functional roles stored in a roles registry by:
   selecting a provisioning unit;
   mapping at least one functional role of the one or more functional roles to the provisioning unit selected;
   selecting at least one application from the plurality of applications associated with the provisioning unit selected;
   importing an application role mapped with the at least one application; and storing the role-context as realization of the role of the user.

3. The method of claim 1 further comprises,
   generating one or more events associated with an operation affecting the role-context of the user;
   capturing, by the processor, at least one event of the one or more events;
   determining, by the processor, re-mapping of the user with the provisioning unit and the at least one functional role and the application context based upon the at least one event;
   executing a call back service for the user if the user so re-mapped with the provisioning unit and the at least one functional role and the application context to revise the access right.

4. The method of claim 3, wherein the at least one event pertains to an action that is initiated by at least one of editing association of the user from the plurality of users, or a change in the role-context of the user, and a combination thereof.

5. A system for a role based access control of a plurality of users in a heterogeneous enterprise environment, the system comprising:
   a processor; and
   a memory coupled to the processor, wherein the processor executes computer readable instructions stored in the memory to:
   create a plurality of provisioning units, wherein each provisioning unit represents one or more functional roles with respect to organizational context;
   establish a functional relationship between each of the plurality of provisioning units and the one or more applications of a plurality of applications by mapping each of the one or more applications embedded in an application registry module with each of the plurality of provisioning units;
   map a user of a plurality of users with a provisioning unit of the plurality of provisioning units having at least one functional role of the one or more functional roles associated with the user;
   create a role-context for the user by mapping 1) the at least one functional role of the one or more functional roles associated with the user, 2) the provisioning unit mapped with the user, 3) an application context of each of the one or more applications associated with the provisioning unit mapped with the user, represented by an identity of one or more Information Technology (IT) resources, and 4) a business function context represented by categorization of an access right as defined in the identity of the one or more IT resources as mentioned in the application context in order to get an access to the one or more applications;

register one or more services to initialize functional role of the user to receive the access right with the one or more applications based on the role-context of the user to enable the role-context based access control for the user; and receive, from a computer of the user, an access permission to the one or more applications, based on the role-context of the user, wherein the access permission is received from the processor.

6. The system of claim 5, wherein the one or more applications are registered in an application registry module, wherein the application registry module further comprises a roles registry module and a call back service registry module.

7. The system of claim 6, wherein the roles registry module is configured to optionally store entitlements associated with each of the plurality of users.

8. The system of claim 5 further comprises,
generating one or more events associated with an operation affecting the role-context of the user;
capturing, by the processor, at least one event;
determining, by the processor, re-mapping of the user with the provisioning unit and the at least one functional role and the application context based upon the at least one event;
executing a call back service for the user if the user so re-mapped with the provisioning unit and the at least one functional role and the application context to revise the access right.

9. The system of claim 8, wherein the at least one event is triggered by at least one of an action of editing at least one user from the plurality of users mapped, changing the role-context of the user, and a combination thereof.

* * * * *

UNITED STATES PATENT AND TRADEMARK OFFICE
CERTIFICATE OF CORRECTION

PATENT NO. : 9,461,978 B2  
APPLICATION NO. : 14/032777  
DATED : October 4, 2016  
INVENTOR(S) : Satya Narayan Mishra and Ashesh Misra Page 1 of 1

It is certified that error appears in the above-identified patent and that said Letters Patent is hereby corrected as shown below:

Column 11, Claim 5 Line 1, after "initialize", insert --a--.

Signed and Sealed this  
Twenty-seventh Day of March, 2018

Andrei Iancu  
*Director of the United States Patent and Trademark Office*